(12) United States Patent
Zhang

(10) Patent No.: US 12,279,202 B2
(45) Date of Patent: Apr. 15, 2025

(54) DEVICE-TO-DEVICE RELAY PROCESSING METHOD, DEVICE AND APPARATUS, AND STORAGE MEDIUM

(71) Applicant: DATANG MOBILE COMMUNICATIONS EQUIPMENT CO., LTD., Beijing (CN)

(72) Inventor: Huiying Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 333 days.

(21) Appl. No.: 17/790,737

(22) PCT Filed: Jan. 28, 2021

(86) PCT No.: PCT/CN2021/074226
§ 371 (c)(1),
(2) Date: Jul. 3, 2022

(87) PCT Pub. No.: WO2021/159966
PCT Pub. Date: Aug. 19, 2021

(65) Prior Publication Data
US 2023/0049573 A1    Feb. 16, 2023

(30) Foreign Application Priority Data
Feb. 11, 2020 (CN) .......................... 202010086879.1

(51) Int. Cl.
*H04W 4/00* (2018.01)
*H04W 48/20* (2009.01)
(Continued)

(52) U.S. Cl.
CPC ......... *H04W 48/20* (2013.01); *H04W 72/046* (2013.01); *H04W 76/30* (2018.02)

(58) Field of Classification Search
CPC ... H04W 48/20; H04W 72/046; H04W 76/30; H04W 76/14; H04W 40/22; H04W 40/24;
(Continued)

(56) References Cited

U.S. PATENT DOCUMENTS

| 11,452,154 B2 * | 9/2022 | Xu ........................ H04W 76/14 |
| 2015/0215028 A1 * | 7/2015 | Ljung ..................... H04W 4/06 370/315 |

(Continued)

FOREIGN PATENT DOCUMENTS

| CN | 103781016 A | 5/2014 |
| CN | 106470491 A | 3/2017 |

(Continued)

OTHER PUBLICATIONS

3GPP TR 23.703 V12.0.0, 3rd Generation Partnership Project;Technical Specification Group Services and System Aspects;Study on architecture enhancements to support Proximity-based Services (ProSe) (Release 12) total 324 pages, Feb. 2014.

*Primary Examiner* — Chuong T Ho
(74) *Attorney, Agent, or Firm* — Kilpatrick Townsend & Stockton LLP

(57) ABSTRACT

The embodiments of the present application relate to the field of wireless communications, and provide a device-to-device relay processing method, device and apparatus, and a storage medium, which are used for implementing an activation or deactivation function of the device-to-device relay. Said method includes according to channel quality information of a direct link between a first device and at least two second devices, the first device determining a processing manner of the first device for a device-to-device relay function, the processing manner including activating the device-to-device relay function or deactivating the device-to-device relay function.

11 Claims, 6 Drawing Sheets

(51) Int. Cl.
*H04W 72/044* (2023.01)
*H04W 76/30* (2018.01)

(58) Field of Classification Search
CPC ..... H04W 88/04; H04W 40/12; H04W 76/23; H04W 76/27; H04L 1/0001; H04L 2001/0097; H04L 1/0693; H04L 1/1812; Y02D 30/70
USPC .......................................................... 370/329
See application file for complete search history.

(56) References Cited

U.S. PATENT DOCUMENTS

| | | | |
|---|---|---|---|
| 2017/0208636 A1* | 7/2017 | Agiwal | H04W 48/10 |
| 2017/0317740 A1* | 11/2017 | Basu Mallick | H04W 88/04 |
| 2017/0347338 A1* | 11/2017 | Chen | H04W 72/30 |
| 2017/0359116 A1* | 12/2017 | Hwang | H04W 40/22 |
| 2017/0359766 A1* | 12/2017 | Agiwal | H04L 5/0048 |
| 2018/0035308 A1* | 2/2018 | Nguyen | H04W 72/1273 |
| 2018/0084481 A1* | 3/2018 | Wang | H04W 40/22 |
| 2018/0123683 A1* | 5/2018 | Wakabayashi | H04W 40/22 |
| 2018/0160338 A1* | 6/2018 | Huang | H04W 8/08 |
| 2018/0234862 A1* | 8/2018 | Lee | H04W 88/04 |
| 2018/0242381 A1* | 8/2018 | Wei | H04W 40/22 |
| 2018/0324882 A1* | 11/2018 | Gulati | H04B 7/15542 |

FOREIGN PATENT DOCUMENTS

| | | |
|---|---|---|
| CN | 108541379 A | 9/2018 |
| CN | 110099423 A | 8/2019 |
| CN | 111901840 A | 11/2020 |
| WO | 2015119538 A1 | 8/2015 |
| WO | 2016183747 A1 | 11/2016 |

* cited by examiner

DEVICE-TO-DEVICE RELAY PROCESSING METHOD, DEVICE AND APPARATUS, AND STORAGE MEDIUM

CROSS-REFERENCE OF RELATED APPLICATIONS

The present application is a National Stage of International Application No. PCT/CN2021/074226, filed on Jan. 28, 2021, which claims the priority from Chinese Patent Application No. 202010086879.1, filed with the Chinese Patent Office on Feb. 11, 2020 and entitled "Device-to-Device Relay Processing Method, Device and Apparatus, and Storage Medium", both of which are hereby incorporated by reference in their entireties.

FIELD OF DISCLOSURE

The present application relates to the field of wireless communication technologies, and in particular, to a device-to-device relay processing method, device and apparatus, and a storage medium.

BACKGROUND

In the related art, the direct communication between devices is allowed between devices close to each other. The D2D (Device-to-Device) is a direct communication mechanism between devices. In order to expand the coverage of network services, the 3rd Generation Partnership Project (3GPP) introduces the UE-to-Network Relay based on the layer 3 in the Rel-13.

Here, generally, when the channel quality of the Uu (The Radio interface between UTRAN and the User Equipment) channel between a relay device and a network side device (such as base station) is between the preconfigured high threshold and low threshold, the relay device activates the device-to-network relay function. However, there is no solution for activation or deactivation of the device-to-device relay at this stage.

BRIEF SUMMARY

The present application provides a device-to-device relay processing method, device and apparatus, and a storage medium, and to provide a method for activating a device-to-device relay function.

In one embodiment, the present application provides a device-to-device relay processing method, including:
  determining, by a first device, a processing manner of the first device for a device-to-device relay function according to channel quality information of direct links between the first device and at least two second devices, where the processing manner includes activating the device-to-device relay function or deactivating the device-to-device relay function.

In one embodiment, the determining, by the first device, the processing manner of the first device for the device-to-device relay function according to the channel quality information of the direct links between the first device and the at least two second devices, includes:
  comparing, by the first device, a parameter included in the channel quality information of the direct links between the first device and the at least two second devices with a threshold value corresponding to the parameter to determine the processing manner for the device-to-device relay function.

In one embodiment, the parameter of the channel quality information includes a first-type parameter and/or a second-type parameter, where:
  the first-type parameter includes one or more of: Channel State Information (CSI), Received Signal Strength Indication (RSSI), Reference Signal Receiving Power (RSRP), or Reference Signal Receiving Quality (RSRQ);
  the second-type parameter includes one or more of: a block error rate or a bit error rate.

In one embodiment, the parameter of the channel quality information includes the first-type parameter; and comparing, by the first device, the parameter included in the channel quality information of the direct links between the first device and the at least two second devices with the threshold value corresponding to the parameter to determine the processing manner for the device-to-device relay function, includes:
  in response to the direct links being unidirectional direct links: measuring, by the first device, a first-type parameter of channel quality information of signals sent by the at least two second devices through the direct links with the at least two second devices; and determining that the processing manner is activating the device-to-device relay function in response to the first device not activating the device-to-device relay function and a duration in which the measured first-type parameter of the channel quality information of the at least two direct links is higher than the threshold value corresponding to the parameter reaches a set duration; and/or
  in response to the direct links being bidirectional direct links: measuring, by the first device, a first-type parameter of channel quality information of signals sent by the at least two second devices through the direct links with the at least two second devices, and receiving measurement reports sent by the at least two second devices through the direct links, where each of the measurement reports contains a first-type parameter of channel quality information obtained by a corresponding second device measuring a signal sent by the first device; and determining that the processing manner is activating the device-to-device relay function in response to the first device not activating the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration.

In one embodiment, the parameter of the channel quality information includes the second-type parameter; and comparing, by the first device, the parameter included in the channel quality information of the direct links between the first device and the at least two second devices with the threshold value corresponding to the parameter to determine the processing manner for the device-to-device relay function, includes:
  in response to the direct links being unidirectional direct links: measuring, by the first device, a second-type parameter of channel quality information of signals sent by the at least two second devices through the direct links with the at least two second devices; and determining that the processing manner is activating the device-to-device relay function in response to the first device not activating the device-to-device relay function and a duration in which the measured second-type parameter of the channel quality information of the at least two direct links is lower than the threshold value corresponding to the parameter reaches a set duration; and/or in response to the direct links being bidirectional direct links: measuring, by the first device, a second-type parameter of channel quality information of signals sent by the at least two second devices through the direct links with the at least two second devices, and receiving measurement reports sent by the at least two second devices through the direct links, where each of the measurement reports contains a second-type parameter of channel quality information obtained by a corresponding second device measuring a signal sent by the first device; and determining that the processing manner is activating the device-to-device relay function in response to the first device not activating the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

In one embodiment, the parameter of the channel quality information contained in the measurement reports is determined through Hybrid Automatic Repeat Request (HARQ) information sent by the at least two second devices.

In one embodiment, the method further includes:
determining that the processing manner is deactivating the device-to-device relay function in response to the first device having activated the device-to-device relay function and less than two direct links meet a condition that the duration in which the measured first-type parameter of the channel quality information is higher than the threshold value corresponding to the parameter reaches the set duration.

In one embodiment, the method further includes:
determining that the processing manner is deactivating the device-to-device relay function in response to the first device having activated the device-to-device relay function and less than two direct links meet a condition that the duration in which the measured second-type parameter of the channel quality information is lower than the threshold value corresponding to the parameter reaches the set duration.

In one embodiment, the set duration and/or the threshold value corresponding to the parameter is/are configured by a network; and/or
the set duration and/or the threshold value corresponding to the parameter is/are pre-configured for the first device.

In another embodiment, the present application provides a terminal device, including a processor and a memory;
where the memory is configured to store a program executable by the processor, and the processor is configured to read the program in the memory and execute a following process:
determining a processing manner of the terminal device for a device-to-device relay function according to channel quality information of direct links between the terminal device and at least two second devices, where the processing manner includes activating the device-to-device relay function or deactivating the device-to-device relay function.

In one embodiment, the processor is configured to:
compare a parameter included in the channel quality information of the direct links between the terminal device and the at least two second devices with a threshold value corresponding to the parameter to determine the processing manner for the device-to-device relay function.

In one embodiment, the parameter of the channel quality information includes a first-type parameter and/or a second-type parameter, where:
the first-type parameter includes one or more of: CSI, RSSI, RSRP, or RSRQ;
the second-type parameter includes one or more of: a block error rate or a bit error rate.

In one embodiment, the parameter of the channel quality information includes the first-type parameter; and the processor is configured to:
in response to the direct links being unidirectional direct links: measure a first-type parameter of channel quality information of signals sent by the at least two second devices through the direct links with the at least two second devices; and determine that the processing manner is activating the device-to-device relay function in response to the terminal device not activating the device-to-device relay function and a duration in which the measured first-type parameter of the channel quality information of the at least two direct links is higher than the threshold value corresponding to the parameter reaches a set duration; and/or
in response to the direct links being bidirectional direct links: measure a first-type parameter of channel quality information of signals sent by the at least two second devices through the direct links with the at least two second devices, and receive measurement reports sent by the at least two second devices through the direct links, where each of the measurement reports contains a first-type parameter of channel quality information obtained by a corresponding second device measuring a signal sent by the terminal device; and determine that the processing manner is activating the device-to-device relay function in response to the terminal device not activating the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration.

In one embodiment, the parameter of the channel quality information includes the second-type parameter; and the processor is configured to:
in response to the direct links being unidirectional direct links: measure a second-type parameter of channel quality information of signals sent by the at least two second devices through the direct links with the at least two second devices; and determine that the processing manner is activating the device-to-device relay function in response to the terminal device not activating the device-to-device relay function and a duration in which the measured second-type parameter of the channel quality information of the at least two direct links is lower than the threshold value corresponding to the parameter reaches a set duration; and/or in response to the direct links being bidirectional direct links: measure a second-type parameter of channel quality information of signals sent by the at least two second devices through the direct links with the at least two second devices, and receive measurement reports sent by the at least two second devices through the direct links, where each of the measurement reports contains a second-type parameter of channel quality information obtained by a corresponding second device measuring a signal sent by the terminal device; and determine that the processing manner is activating the device-to-device relay function in response to the terminal device not activating the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

In one embodiment, the parameter of the channel quality information contained in the measurement reports is determined through HARQ information sent by the at least two second devices.

In one embodiment, the processor is further configured to:
determine that the processing manner is deactivating the device-to-device relay function in response to the terminal device having activated the device-to-device relay function and less than two direct links meet a condition that the duration in which the measured first-type parameter of the channel quality information is higher than the threshold value corresponding to the parameter reaches the set duration.

In one embodiment, the processor is further configured to:
determine that the processing manner is deactivating the device-to-device relay function in response to the terminal device having activated the device-to-device relay function and less than two direct links meet a condition that the duration in which the measured second-type parameter of the channel quality information is lower than the threshold value corresponding to the parameter reaches the set duration.

In one embodiment, the set duration and/or the threshold value corresponding to the parameter is/are configured by a network; and/or
the set duration and/or the threshold value corresponding to the parameter is/are pre-configured for the terminal device.

In yet another embodiment, the present application further provides a terminal apparatus, including:
an information determining device configured to determine channel quality information of direct links between the terminal apparatus and at least two second devices;
an activation mode determining device configured to determine a processing manner of the terminal apparatus for a device-to-device relay function according to the channel quality information of the direct links between the terminal apparatus and the at least two second devices, where the processing manner includes activating the device-to-device relay function or deactivating the device-to-device relay function.

In one embodiment, the activation mode determining device is configured to:
compare a parameter included in the channel quality information of the direct links between the terminal apparatus and the at least two second devices with a threshold value corresponding to the parameter to determine the processing manner for the device-to-device relay function.

In one embodiment, the parameter of the channel quality information includes a first-type parameter and/or a second-type parameter, where:
the first-type parameter includes one or more of: CSI, RSSI, RSRP, or RSRQ;
the second-type parameter includes one or more of: a block error rate or a bit error rate.

In one embodiment, the parameter of the channel quality information includes the first-type parameter, and the activation mode determining device is configured to:
in response to the direct links being unidirectional direct links: measure a first-type parameter of channel quality information of signals sent by the at least two second devices through the direct links with the at least two second devices; and determine that the processing manner is activating the device-to-device relay function in response to the terminal apparatus not activating the device-to-device relay function and a duration in which the measured first-type parameter of the channel quality information of the at least two direct links is higher than the threshold value corresponding to the parameter reaches a set duration; and/or in response to the direct links being bidirectional direct links: measure a first-type parameter of channel quality information of signals sent by the at least two second devices through the direct links with the at least two second devices, and receive measurement reports sent by the at least two second devices through the direct links, where each of the measurement reports contains a first-type parameter of channel quality information obtained by a corresponding second device measuring a signal sent by the terminal apparatus; and determine that the processing manner is activating the device-to-device relay function in response to the terminal apparatus not activating the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration.

In one embodiment, the parameter of the channel quality information includes the second-type parameter, and the activation mode determining device is configured to:
in response to the direct links being unidirectional direct links: measure a second-type parameter of channel quality information of signals sent by the at least two second devices through the direct links with the at least two second devices; and determine that the processing manner is activating the device-to-device relay function in response to the terminal apparatus not activating the device-to-device relay function and a duration in which the measured second-type parameter of the channel quality information of the at least two direct links is lower than the threshold value corresponding to the parameter reaches a set duration; and/or in response to the direct links being bidirectional direct links: measure a second-type parameter of channel quality information of signals sent by the at least two second devices through the direct links with the at least two second devices, and receive measurement reports sent by the at least two second devices through the direct links, where each of the measurement reports contains a second-type parameter of channel quality information obtained by a corresponding second device measuring a signal sent by the terminal apparatus; and determine that the processing manner is activating the device-to-device relay function in response to the terminal apparatus not activating the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

In one embodiment, the parameter of the channel quality information contained in the measurement reports is determined through HARQ information sent by the at least two second devices.

In one embodiment, the activation mode determining device is further configured to:

determine that the processing manner is deactivating the device-to-device relay function in response to the device-to-device relay function having been activated and less than two direct links meet a condition that the duration in which the measured first-type parameter of the channel quality information is higher than the threshold value corresponding to the parameter reaches the set duration.

In one embodiment, the activation mode determining device is further configured to:

determine that the processing manner is deactivating the device-to-device relay function in response to the device-to-device relay function having been activated and less than two direct links meet a condition that the duration in which the measured second-type parameter of the channel quality information is lower than the threshold value corresponding to the parameter reaches the set duration.

In one embodiment, the set duration and/or the threshold value corresponding to the parameter is/are configured by a network; and/or the set duration and/or the threshold value corresponding to the parameter is/are pre-configured for the terminal apparatus.

In some embodiments, the present application further provides a computer storage medium storing a computer program thereon, where the program implements the steps of the method described in the embodiments when executed by a processing device.

The solution of the present application has at least the following beneficial effects.

In the solution of the present application, the first device determines to activate the device-to-device relay function or deactivate the device-to-device relay function according to the channel quality information of the direct links between the first device and other devices, and to realize the activation or deactivation operation of the device-to-device relay.

BRIEF DESCRIPTION OF THE DRAWINGS

In order to illustrate the embodiments of the present application more clearly, the accompanying figures which need to be used in describing the embodiments will be introduced below briefly. The accompanying figures described below are only some embodiments of the present application, and other accompanying figures can also be obtained according to these accompanying figures.

DETAILED DESCRIPTION OF THE EMBODIMENTS

Figure 1:
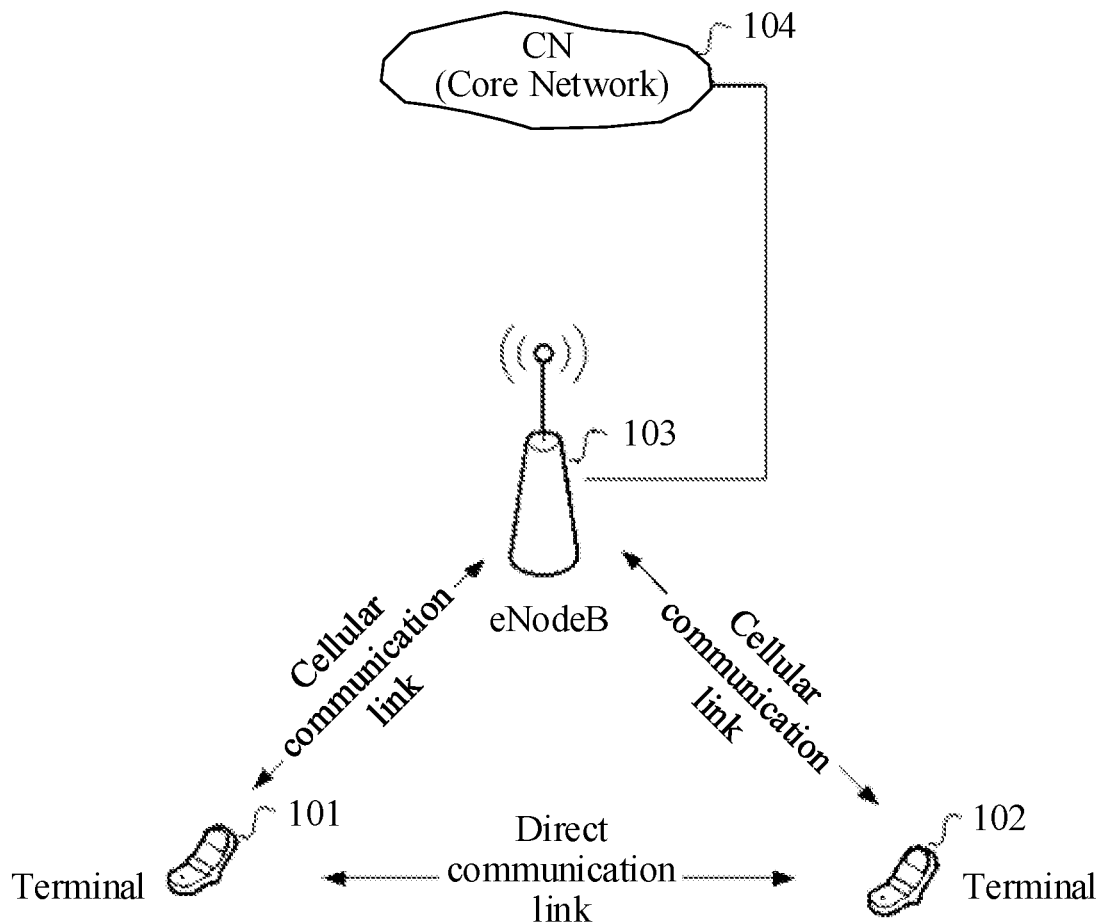
FIG. 1 is a schematic diagram of a system architecture according to an embodiment of the present application.

The embodiments of the present disclosure will be described clearly and completely with reference to the accompanying drawings.

It should be noted that the terms such as "first", "second" and the like in the specification and claims of the present application and the above drawings are used to distinguish the similar objects, but not necessarily to describe a particular order or sequence. It should be understood that the data used in this way is interchangeable under appropriate circumstances, and the embodiments of the present application described herein can be implemented in an order other than those illustrated or described herein. The implementation modes described in the following exemplary embodiments do not represent all the implementation modes consistent with the present application. On the contrary, they are only the examples of the devices and methods which are detailed in the attached claims and consistent with some embodiments of the present application.

Some terms that appear herein will be explained below.

1. The term "and/or" in the embodiments of the present application describes the association relationship of associated objects, indicating that there may be three relationships, for example, A and/or B may represent: only A, both A and B, and only B. The character "/" generally indicates that the associated objects have a kind of "or" relationship.

2. Block Error Rate (BLER) is the percentage of blocks where errors occur in all sent blocks. The block error rate is a long-term statistical average and an important indicator reflecting the network performance and service quality.

In a wireless network, one device sends data to another device in blocks. The sender uses the data in the block to calculate a Cyclic Redundancy Check (CRC), and sends the CRC to the receiver together with the block. The receiver calculates a CRC according to the received data and compares this CRC with the received CRC. If they are equal, the receiver considers that it has received the correct data successfully, and replies an Acknowledgement (ACK) to the sender. If they are not equal, the receiver considers that it has received the erroneous data, and replies a Negative-Acknowledgment (NACK) to the sender, to ask the sender to retransmit the block. For example, assuming that the data of 500 blocks is sent, ACKs are replied for 499 blocks and an NACK is replied for 1 block, then the BLER is $1/500=0.002*100\%=0.2\%$.

3. Symbol Error Rate (SER) is an indicator to measure the accuracy of data transmission within the specified time. The Symbol Error Rate=erroneous symbols in transmission/total number of symbols transmitted*100%. In addition, the symbol error rate is also defined to be used to measure the frequency at which erroneous symbols occur. The research on symbol error rate under specific conditions is of great significance to enhance the performance of the wireless communication system and improve the quality of data transmission.

4. HARQ is a technology formed by combining Forward Error Correction (FEC) with Automatic Repeat Request (ARQ). When the decoding fails, the receiver saves the received data and requests the sender to retransmit the data. The receiver combines the retransmitted data with the previously received data before decoding.

The network architectures and service scenarios described in the embodiments of the present application are intended to illustrate the embodiments of the present application more clearly, and do not constitute a limitation on the embodiments of the present application. With the evolution of network architectures and the emergence of new service scenarios, the embodiments of the present application are also applicable to similar problems.

In order to make the embodiments of the present application clearer, the present application will be further illustrated below in details with reference to the accompanying figures. The described embodiments are merely a part of the embodiments of the present application but not all the embodiments. Based upon the embodiments of the present application, all of other embodiments to the protection scope of the present application.

FIG. 1 exemplarily shows a schematic diagram of a system architecture applicable to the embodiments of the present application. As shown in FIG. 1, a terminal 101 and a terminal 102 may communicate with a Core Network (CN) device 104 via an Access Network (AN) entity 103 in the future 5G system architecture. The terminal may refer to a UE (User Equipment), an access terminal, a user device, a user station, a mobile radio station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-carried device, a wearable device, a terminal in the future 5G network, etc. For the convenience of description, FIG. 1 only illustrates two terminals. In an actual network, terminals may coexist, which will not be repeated here.

The access network entity 103 may also be referred to as a Radio Access Network (RAN) entity, which is collectively referred to as access network entity or (R)AN entity below, and is mainly responsible for providing wireless connections for the terminal 101 and terminal 102, ensuring the reliable transmission of uplink and downlink data of the terminal 101 and terminal 102, and so on. The access network entity 103 may be a Next generation Node B (gNB) in the 5G system, or may be a Base Transceiver Station (BTS) in the Global System of Mobile communication (GSM) system or Code Division Multiple Access (CDMA), or may be a NodeB (NB) in the Wideband Code Division Multiple Access (WCDMA) system, or may be an evolutional Node B (eNB or eNodeB) in the Long Term Evolution (LTE) system, etc. In one embodiment, the access network entity in the embodiments of the present application is a satellite base station.

The core network device 104 is responsible for connecting a terminal device to different networks according to the call request or data request sent by the terminal device through the access network, as well as charging, mobility management, and so on. The core network device may be a 4G core network, an Evolved Packet Core (EPC), or a 5G core network device.

Here, the links through which the terminal 101 and the terminal 102 communicate with the core network device 104 via the access network entity 103 are cellular communication links between the network and terminals, and may also be called Uu links, and the corresponding interface is called a Uu interface. The link for communication between the terminal 101 and the terminal 102 is a direct communication link between devices, and may also be called a Sidelink (side link), and the corresponding wireless interface is called a direct communication interface and also called a Sidelink interface.

It should be noted that the foregoing system architecture is only an example of the system architecture applicable to the embodiments of the present application. Compared with the system architecture shown in FIG. 1, the system architecture applicable to the embodiments of the present application can also add other entities or reduce some entities.

The direct communication between devices is allowed between devices close to each other. Typical direct communication scenarios include the following three types.

1. One-to-one communication between direct communication devices (also called unicast).

2. A device can send the same data to all devices in a communication group at a time (also called multicast).

3. A device can send the same data to all nearby devices at a time (also called broadcast).

The background information on the direct communication of two different systems will be introduced below.

(1) Introduction to the related background of the device-to-network relay in the direct communication of the LTE system.

The devices for direct communication may all be online or offline, or some devices may be online and some devices may be offline. The so-called online means that the devices participating in the direct communication are located within the coverage of the communication carriers of the 3GPP base station, and the so-called offline means that the devices participating in the direct communication are not within the coverage of the communication carriers of the 3GPP base station.

It should be noted that the direct communication scenario supported by the LTE system is only broadcast.

In the direct communication of the LTE system, the method of activating the device-to-network relay is: when the channel quality of the Uu channel between an online device that supports the device-to-network relay function and a network-side device such as base station is between the pre-configured high and low thresholds, i.e., higher than the pre-configured low threshold and lower than the pre-configured high threshold, the device can activate the device-to-network relay function, where the high and low thresholds may be flexibly set as needed.

However, there is no method for activating or deactivating the device-to-device relay in the related art.

(2) Introduction to the related background of the direct communication of the New Radio (NR) system.

The unicast and multicast are introduced into the direct communication of the NR system, and the feedback is introduced into the unicast and multicast, that is, the receiver can feed back the CSI and/or HARQ feedback information to the sender, and the sender can adjust the sending parameters according to the CSI and/or retransmit the parameters according to the HARQ feedback information.

The present application designs a device-to-device relay processing method based on the channel quality of the sidelink channel in the NR system.

Figure 2:
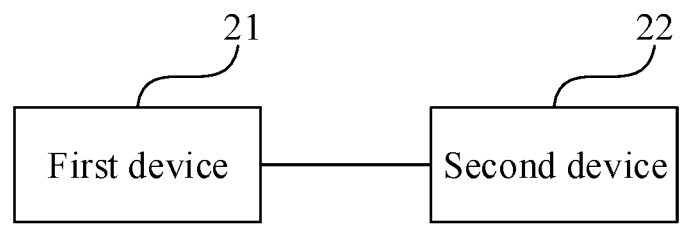
FIG. 2 is a schematic diagram of a system for determining a processing manner for device-to-device relay according to an embodiment of the present application.

As shown in FIG. 2, an application system for device-to-device relay according to an embodiment of the present application includes: a first device 21 and at least one second device 22.

The first device 21 is configured to determine a processing manner of the first device 21 for a device-to-device relay function according to the channel quality information of direct links between the first device 21 and at least two second devices 22, where the processing manner includes activating the device-to-device relay function or deactivating the device-to-device relay function.

The second device 22 is configured to send a signal to the first device 21 through a direct link, and the first device 21 determines the channel quality information of the direct link according to the signal sent by the second device 22; and the second device 22 may further determine the channel quality information of the direct link according to a signal sent by the first device 21 on the direct link, and sends the determined channel quality information to the first device 21.

In one embodiment, the direct link includes a unidirectional direct link or a bidirectional direct link; the unidirectional direct link may include, but is not limited to, some or all of Physical Sidelink Control Channel (PSCCH), Physical Sidelink Share Channel (PSSCH), Physical Sidelink Broadcast Channel (PSBCH), or synchronization signal link; the bidirectional direct link may also include, but is not limited to, some or all of PSCCH, PSSCH, PSBCH, or synchronization signal link.

For the unidirectional direct link, the first device 21 can receive a signal sent by the second device 22 through the unidirectional direct link but cannot send a signal to the second device 22 through the unidirectional direct link; for the bidirectional direct link, the first device 21 can receive a signal sent by the second device 22 through the bidirectional direct link and can also send a signal to the second device 22 through the bidirectional direct link; and similarly, the second device 22 can also send or receive a signal to/from the first device 21 through the bidirectional direct link, where the above-mentioned cases of sending and receiving signals are only examples.

Here, the channel quality information includes some or all of:

CSI, RSRP, RSRQ, RSSI, block error rate, or bit error rate.

An embodiment of the present application provides a device-to-device relay processing method, which will be described in detail below.

The first device determines a processing manner of the first device for a device-to-device relay function according to the channel quality information of direct links between the first device and at least two second devices, where the processing manner includes activating the device-to-device relay function or deactivating the device-to-device relay function.

That is, the first device determines the processing manner for the device-to-device relay function according to the channel quality information of the direct links between the first device and the second devices, and in one embodiment, the first device may compare a parameter included in the channel quality information of the direct links between the first device and the at least two second devices with a threshold value corresponding to the parameter to determine the processing manner for the device-to-device relay function.

As in one embodiment, the parameter of the channel quality information includes a first-type parameter, or a second-type parameter, or a first-type parameter and a second-type parameter, where:

the first-type parameter includes one or more of CSI, RSSI, RSRP, or RSRQ; and the second-type parameter includes one or more of block error rate or bit error rate.

Further, in an embodiment of the present application, for different types of parameters of the channel quality information, the first device may determine the processing manner for the device-to-device relay function in different ways; and furthermore, for different types of direct links (such as unidirectional direct link or bidirectional direct link), the first device may also determine the processing manner for the device-to-device relay function in different ways. The processes in which the first device determines the processing manner for the device-to-device relay when the channel quality information includes the first-type parameter and the second-type parameter will be respectively described in detail below.

(1) The parameter of the channel quality information includes the first-type parameter.

As in one embodiment, when the parameter of the channel quality information includes the first-type parameter, the direct link may be a unidirectional direct link and/or a bidirectional direct link, and the first device may determine the processing manner for the device-to-device relay function in different ways for different types of direct links, which will be respectively described below.

The first case of determining the processing manner: the direct link is a unidirectional direct link.

When the direct link is a unidirectional direct link, the first device that does not currently activate the device-to-device relay function only needs to determine that the channel quality of the unidirectional direct link meets the condition for activating the device-to-device relay function, in order to activate the device-to-device relay function; and further, for the unidirectional direct link, the channel quality of the unidirectional direct link can be determined according to the signal sent by the second device to the first device.

In one embodiment, when the direct link is a unidirectional direct link, the first device measures a first-type parameter of the channel quality information of the signals sent by the at least two second devices through the direct links with the at least two second devices.

If the first device does not activate the device-to-device relay function and a duration in which the measured first-type parameter of the channel quality information of the at least two direct links is higher than the threshold value corresponding to the parameter reaches a set duration, it is determined that the processing manner is activating the device-to-device relay function.

The second case of determining the processing manner: the direct link is a bidirectional direct link.

When the direct link is a bidirectional direct link, the first device that does not currently activate the device-to-device relay function can activate the device-to-device relay function when judging that the channel quality of the direct link in the direction in which the first device receives signals meets the condition for activating the device-to-device relay function and the channel quality of the direct link in the direction in which the first device sends signals meets the condition for activating the device-to-device relay function.

Further, for the bidirectional direct link, the channel quality of the direct link in the direction in which the first device receives signals may be determined according to, but not limited to, a signal sent by the second device to the first device, and the channel quality of the direct link in the direction in which the first device sends signals may be determined based on the channel quality information determined by the second device according to a signal sent by the first device and sent by the second device.

In one embodiment, when the direct link is a bidirectional direct link, the first device measures a first-type parameter of the channel quality information of the signals sent by the at least two second devices through the direct links with the at least two second devices, and receives measurement reports sent by the at least two second devices through the direct links, where each of the measurement reports contains a first-type parameter of the channel quality information obtained by a corresponding second device measuring a signal sent by the first device.

If the first device does not activate the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration, it is determined that the processing manner is activating the device-to-device relay function.

As a possible embodiment, when the direct link is a bidirectional direct link, and when the first-type parameter of the channel quality information in each of two directions of the direct link is compared with the threshold value corresponding to the parameter, the set durations for comparison in two directions of the direct link can be the same or different; and the threshold values of the parameters for comparison in two directions of the direct link can be the same or different.

In a specific implementation process, when the parameter of the channel quality information includes the first-type parameter, can flexibly select the first case of determining the processing manner and/or the second case of determining the processing manner described above to determine the processing manner for the device-to-device relay function. Here, the duration in which the first-type parameter is higher than the threshold value corresponding to the parameter reaches the set duration, including some or all of the following possible cases.

Case A1: Channel quality information includes CSI.

If the direct link is a unidirectional direct link, the duration in which the CSI measured by the first device is higher than a threshold value corresponding to the CSI reaches a first set duration, that is, the CSI of the unidirectional direct link is higher than the threshold value corresponding to the CSI.

If the direct link is a bidirectional direct link, the duration in which the CSI measured by the first device is higher than the threshold value corresponding to the CSI reaches the first set duration, and the duration in which the CSI in a measurement report received by the first device is higher than the threshold value corresponding to the CSI reaches the first set duration, that is, the channel quality of the direct link in the direction in which the first device receives signals meets the condition for activating the device-to-device relay function, and the channel quality of the direct link in the direction in which the first device sends signals meets the condition for activating the device-to-device relay function.

Case A2: Channel quality information includes RSSI.

If the direct link is a unidirectional direct link, the duration in which the RSSI measured by the first device is higher than a threshold value corresponding to the RSSI reaches a second set duration, that is, the RSSI of the unidirectional direct link is higher than the threshold value corresponding to the RSSI.

If the direct link is a bidirectional direct link, the duration in which the RSSI measured by the first device is higher than the threshold value corresponding to the RSSI reaches the second set duration, and the duration in which the RSSI in a measurement report received by the first device is higher than the threshold value corresponding to the RSSI reaches the second set duration, that is, the channel quality of the direct link in the direction in which the first device receives signals meets the condition for activating the device-to-device relay function, and the channel quality of the direct link in the direction in which the first device sends signals meets the condition for activating the device-to-device relay function.

Case A3: Channel quality information includes RSRP.

If the direct link is a unidirectional direct link, the duration in which the RSRP measured by the first device is higher than a threshold value corresponding to the RSRP reaches a third set duration, that is, the RSRP of the unidirectional direct link is higher than the threshold value corresponding to the RSRP.

If the direct link is a bidirectional direct link, the duration in which the RSRP measured by the first device is higher than the threshold value corresponding to the RSRP reaches the third set duration, and the duration in which the RSRP in a measurement report received by the first device is higher than the threshold value corresponding to the RSRP reaches the third set duration, that is, the channel quality of the direct link in the direction in which the first device receives signals meets the condition for activating the device-to-device relay function, and the channel quality of the direct link in the direction in which the first device sends signals meets the condition for activating the device-to-device relay function.

Case A4: Channel quality information includes RSRQ.

If the direct link is a unidirectional direct link, the duration in which the RSRQ measured by the first device is higher than a threshold value corresponding to the RSRQ reaches a fourth set duration, that is, the RSRQ of the unidirectional direct link is higher than the threshold value corresponding to the RSRQ.

If the direct link is a bidirectional direct link, the duration in which the RSRQ measured by the first device is higher than the threshold value corresponding to the RSRQ reaches the fourth set duration, and the duration in which the RSRQ in a measurement report received by the first device is higher than the threshold value corresponding to the RSRQ reaches the fourth set duration, that is, the channel quality of the direct link in the direction in which the first device receives signals meets the condition for activating the device-to-device relay function, and the channel quality of the direct link in the direction in which the first device sends signals meets the condition for activating the device-to-device relay function.

It should be noted that the above-mentioned first set duration, second set duration, third set duration and fourth set duration may be the same or different according to actual needs.

As in one embodiment, when the parameter of the channel quality information includes the first-type parameter, the above-mentioned set durations and threshold values corresponding to the parameters of the channel quality information may be configured in but not limited to the following ways.

A first configuration method: the above-mentioned set durations and/or threshold values corresponding to the parameters are configured by the network.

A second configuration method: the above-mentioned set durations and/or threshold values corresponding to the parameters are pre-configured for the first device.

A third configuration method: the above-mentioned set durations and/or threshold values corresponding to the parameters are pre-configured by the network for the first device.

The threshold values corresponding to the parameters include some or all of: the threshold value corresponding to CSI, the threshold value corresponding to RSSI, the threshold value corresponding to RSRP, the threshold value corresponding to RSRQ.

As in one embodiment, when the parameter of the channel quality information includes the first-type parameter, the first device may have activated the device-to-device relay function. The first device that has activated the device-to-device relay function needs to determine whether to deactivate the device-to-device relay function, so the above method further includes followings.

If the first device has activated the device-to-device relay function and less than two direct links meet a condition that the duration in which the measured first-type parameter of the channel quality information is higher than the threshold value corresponding to the parameter reaches the set duration, it is determined that the processing manner is deactivating the device-to-device relay function. That is, for the activated device-to-device relay, the device-to-device relay function is deactivated when it is found that the channel quality information of the direct link does not meet the condition.

(2) The parameter of the channel quality information includes the second-type parameter.

As in one embodiment, when the parameter of the channel quality information includes the second-type parameter, the direct link may be a unidirectional direct link and/or a bidirectional direct link, and the first device may determine the processing manner for the device-to-device relay function in different ways for different types of direct links, which will be respectively described below.

The third case of determining the processing manner: the direct link is a unidirectional direct link.

When the direct link is a unidirectional direct link, the first device that does not currently activate the device-to-device relay function only needs to determine that the channel quality of the unidirectional direct link meets the condition for activating the device-to-device relay function, in order to activate the device-to-device relay function; and further, for the unidirectional direct link, the channel quality of the unidirectional direct link can be determined according to the signal sent by the second device to the first device.

In some embodiments, when the direct link is a unidirectional direct link, the first device measures a second-type parameter of the channel quality information of the signals sent by the at least two second devices through the direct links with the at least two second devices.

If the first device does not activate the device-to-device relay function and a duration in which the measured second-type parameter of the channel quality information of the at least two direct links is lower than the threshold value corresponding to the parameter reaches a set duration, it is determined that the processing manner is activating the device-to-device relay function.

The fourth case of determining the processing manner: the direct link is a bidirectional direct link.

When the direct link is a bidirectional direct link, the first device that does not currently activate the device-to-device relay function can activate the device-to-device relay function when judging that the channel quality of the direct link in the direction in which the first device receives signals meets the condition for activating the device-to-device relay function and the channel quality of the direct link in the direction in which the first device sends signals meets the condition for activating the device-to-device relay function.

Further, for the bidirectional direct link, the channel quality of the direct link in the direction in which the first device receives signals may be determined according to, but not limited to, a signal sent by the second device to the first device, and the channel quality of the direct link in the direction in which the first device sends signals may be determined based on the channel quality information determined by the second device according to a signal sent by the first device and sent by the second device.

In some embodiments, when the direct link is a bidirectional direct link, the first device measures a second-type parameter of the channel quality information of the signals sent by the at least two second devices through the direct links with the at least two second devices, and receives measurement reports sent by the at least two second devices through the direct links, where each of the measurement reports contains a second-type parameter of the channel quality information obtained by a corresponding second device measuring a signal sent by the first device.

If the first device does not activate the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration, it is determined that the processing manner is activating the device-to-device relay function.

As a possible embodiment, when the direct link is a bidirectional direct link, and when the second-type parameter of the channel quality information in each of two directions of the direct link is compared with the threshold value corresponding to the parameter, the set durations for comparison in two directions of the direct link can be the same or different; and the threshold values of the parameters for comparison in two directions of the direct link can be the same or different.

It should be noted that the block error rate and the bit error rate can only be obtained after a period of data statistics. If the block error rate or the bit error rate is selected as the parameter of the channel quality information, the first device can, for each second device, count the correctness and error of the received signal data packets sent by the second device within a preset time period, to obtain the block error rate and the bit error rate of the direct link corresponding to the second device.

The duration in which the second-type parameter is lower than the threshold value corresponding to the parameter reaches the set duration, including some or all of the following cases.

Case B1: Channel quality information includes block error rate.

If the direct link is a unidirectional direct link, the duration in which the block error rate measured by the first device is lower than a threshold value corresponding to the block error rate reaches a fifth set duration, that is, the unidirectional direct link meets the condition for activating the device-to-device relay function.

If the direct link is a bidirectional direct link, the duration in which the block error rate measured by the first device is lower than the threshold value corresponding to the block error rate reaches the fifth set duration, and the duration in which the block error rate in a measurement report received by the first device is lower than the threshold value corresponding to the block error rate reaches the fifth set duration, that is, the channel quality of the direct link in the direction in which the first device receives signals meets the condition for activating the device-to-device relay function, and the channel quality of the direct link in the direction in which the first device sends signals meets the condition for activating the device-to-device relay function.

Case B2: Channel quality information includes bit error rate.

If the direct link is a unidirectional direct link, the duration in which the bit error rate measured by the first device is lower than a threshold value corresponding to the bit error rate reaches a sixth set duration, that is, the unidirectional direct link meets the condition for activating the device-to-device relay function.

If the direct link is a bidirectional direct link, the duration in which the bit error rate measured by the first device is lower than the threshold value corresponding to the bit error rate reaches the sixth set duration, and the duration in which the bit error rate in a measurement report received by the first device is lower than the threshold value corresponding to the bit error rate reaches the sixth set duration, that is, the channel quality of the direct link in the direction in which the first device receives signals meets the condition for activating the device-to-device relay function, and the channel quality of the direct link in the direction in which the first device sends signals meets the condition for activating the device-to-device relay function.

It should be noted that the fifth set duration and the sixth set duration may be the same or different according to actual needs.

As in one embodiment, the parameter of the channel quality information contained in the measurement reports is determined through the HARQ information sent by the at least two second devices.

As in one embodiment, when the parameter of the channel quality information includes the second-type parameter, the above-mentioned set durations and threshold values corresponding to the parameters of the channel quality information may be configured in but not limited to the following ways.

A first configuration method: the above-mentioned set durations and/or threshold values corresponding to the parameters are configured by the network.

A second configuration method: the above-mentioned set durations and/or threshold values corresponding to the parameters are pre-configured for the first device.

A third configuration method: the above-mentioned set durations and/or threshold values corresponding to the parameters are pre-configured by the network for the first device.

The threshold values corresponding to the parameters include some or all of: the threshold value corresponding to the bit error rate, the threshold value corresponding to the block error rate.

As in one embodiment, when the parameter of the channel quality information includes the second-type parameter, the first device may have activated the device-to-device relay function. The first device that has activated the device-to-device relay function needs to determine whether to deactivate the device-to-device relay function, so the above method further includes followings.

If the first device has activated the device-to-device relay function and less than two direct links meet a condition that the duration in which the measured second-type parameter of the channel quality information is lower than the threshold value corresponding to the parameter reaches the set duration, it is determined that the processing manner is deactivating the device-to-device relay function. That is, for the activated device-to-device relay, the device-to-device relay function is deactivated when it is found that the channel quality information of the direct link does not meet the condition.

The following content of the embodiments of the present application takes the direct link in the NR system as an example to illustrate the above-mentioned method for determining the device-to-device relay by way of examples.

EXAMPLE 1

This example is an interaction flowchart of a device-to-device relay processing method according to an embodiment of the present application, where the first device is UE1 and the second devices are UE2, UE3 and UE4, as an example for description.

In this example, the parameter of the channel quality information includes a first-type parameter (that is, one or more of CSI, RSSI, RSRP, or RSRQ), the direct link is a unidirectional direct link, and the unidirectional direct link in this example may be PSCCH, PSSCH, PSBCH, synchronization signal link, etc.

There are a unidirectional direct link 1 between UE1 and UE2, a unidirectional direct link 2 between UE1 and UE3, and a unidirectional direct link 3 between UE1 and UE4. The UE2, UE3, and UE4 can send signals through the unidirectional direct link 1, unidirectional direct link 2 and unidirectional direct link 3, respectively.

The UE1 receives the signals sent by the UE2, UE3 and UE4 through the above unidirectional direct links, and measures a first-type parameter of the channel quality information of the unidirectional direct links according to the signals, and then compares the measured first-type parameter with a threshold value corresponding to the parameter to determine whether to activate the device-to-device relay function.

Figure 3:
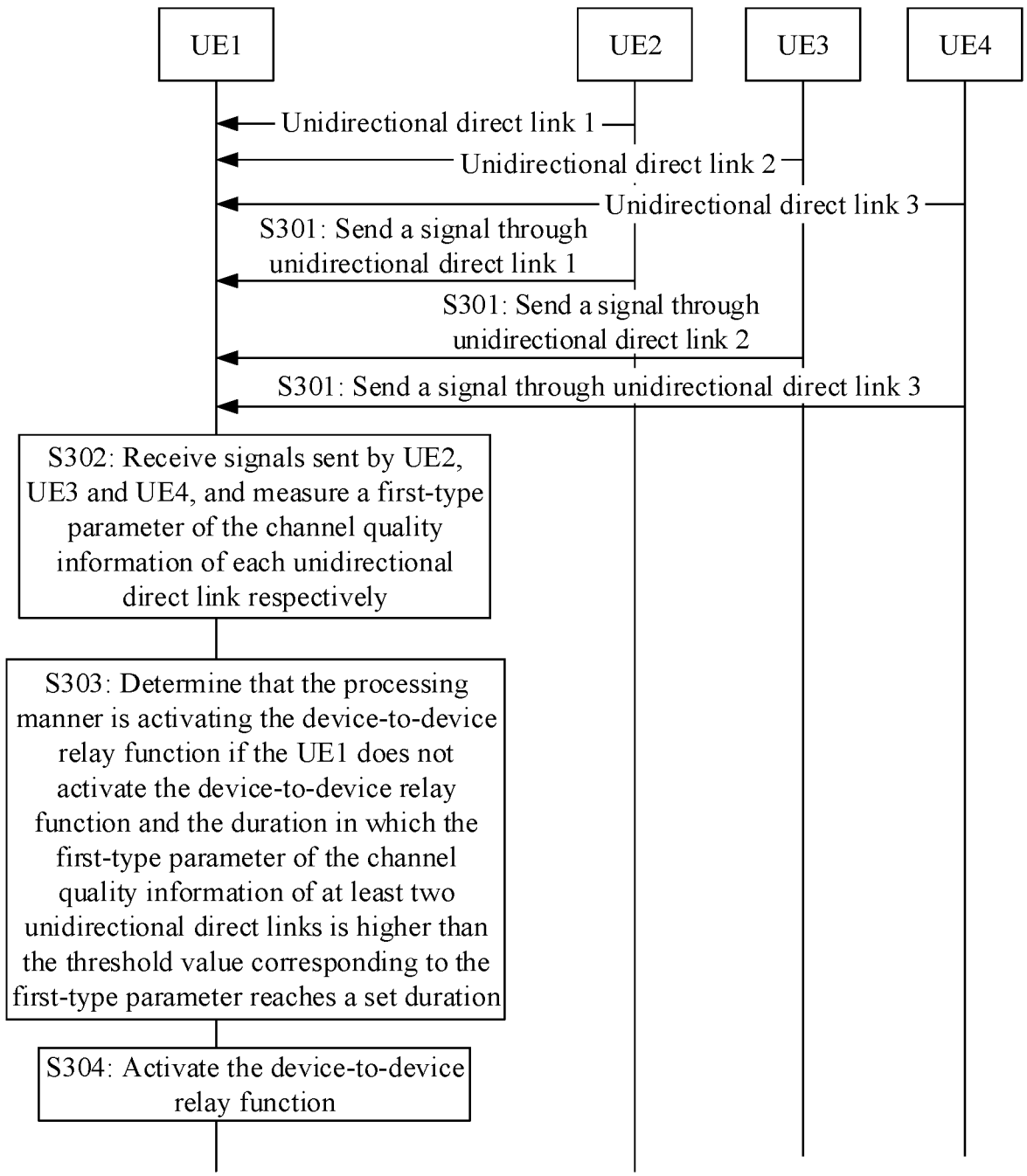
FIG. 3 is an interaction flowchart of a processing method for device-to-device relay according to an embodiment of the present application.

Referring to FIG. 3, the specific process is as follows.

Step S301: the UE2, UE3 and UE4 may send signals through the unidirectional direct link 1, unidirectional direct link 2 and unidirectional direct link 3, respectively.

Step S302: the UE1 receives the signals sent by the UE2, UE3 and UE4 through the unidirectional direct links, and measures a first-type parameter of the channel quality information of each unidirectional direct link respectively.

Here, the UE1 measures one or more of CSI, RSSI, RSRP or RSRQ of each unidirectional direct link.

Step S303: the UE1 compares the measured parameter of the channel quality information of each unidirectional direct link with the threshold value corresponding to the first-type parameter respectively, and determines that the processing manner is activating the device-to-device relay function if the UE1 does not activate the device-to-device relay function and the duration in which the first-type parameter of the channel quality information of at least two unidirectional direct links is higher than the threshold value corresponding to the first-type parameter reaches a set duration.

The threshold value corresponding to the first-type parameter includes one or more of: the threshold value corresponding to CSI, the threshold value corresponding to RSSI, the threshold value corresponding to RSRP, the threshold value corresponding to RSRQ. In this step, the UE1 compares one or more of CSI, RSSI, RSRP or RSRQ obtained by measuring each unidirectional direct link with the corresponding threshold value(s) respectively.

Step S304: the UE1 activates the device-to-device relay function based on the processing manner.

EXAMPLE 2

This example is an interaction flowchart of a device-to-device relay processing method according to an embodiment of the present application, where the first device is UE1 and the second devices are UE2, UE3 and UE4, as an example for description.

In this example, the parameter of the channel quality information includes a first-type parameter (that is, one or more of CSI, RSSI, RSRP, or RSRQ), the direct link is a bidirectional direct link, and the bidirectional direct link in this example may be PSCCH, PSSCH, PSBCH, synchronization signal link, etc.

There are a bidirectional direct link 1 between UE1 and UE2, a bidirectional direct link 2 between UE1 and UE3, and a bidirectional direct link 3 between UE1 and UE4; the UE2, UE3, and UE4 can receive signals sent by the UE1 through the bidirectional direct link 1, bidirectional direct link 2 and bidirectional direct link 3 respectively, and can also send signals and measurement reports for the signals sent by the UE1 through the bidirectional direct link 1, bidirectional direct link 2 and bidirectional direct link 3 respectively.

The UE1 receives the signals sent by the UE2, UE3 and UE4 through the above-mentioned bidirectional direct links, and can also receive the measurement reports sent by the UE2, UE3 and UE4 through the above-mentioned bidirectional direct links; and the UE1 can measure a first-type parameter of the channel quality information of the bidirectional direct links according to the signals, and then compare the measured first-type parameter with a threshold value corresponding to the parameter, to determine whether each bidirectional direct link meets the condition for activating the device-to-device relay function in the direction in which the UE1 receives signals; and the UE can determine whether the bidirectional direct link meets the condition for activating the device-to-device relay function in the direction in which the UE1 sends signals according to the received corresponding measurement report.

Figure 4:
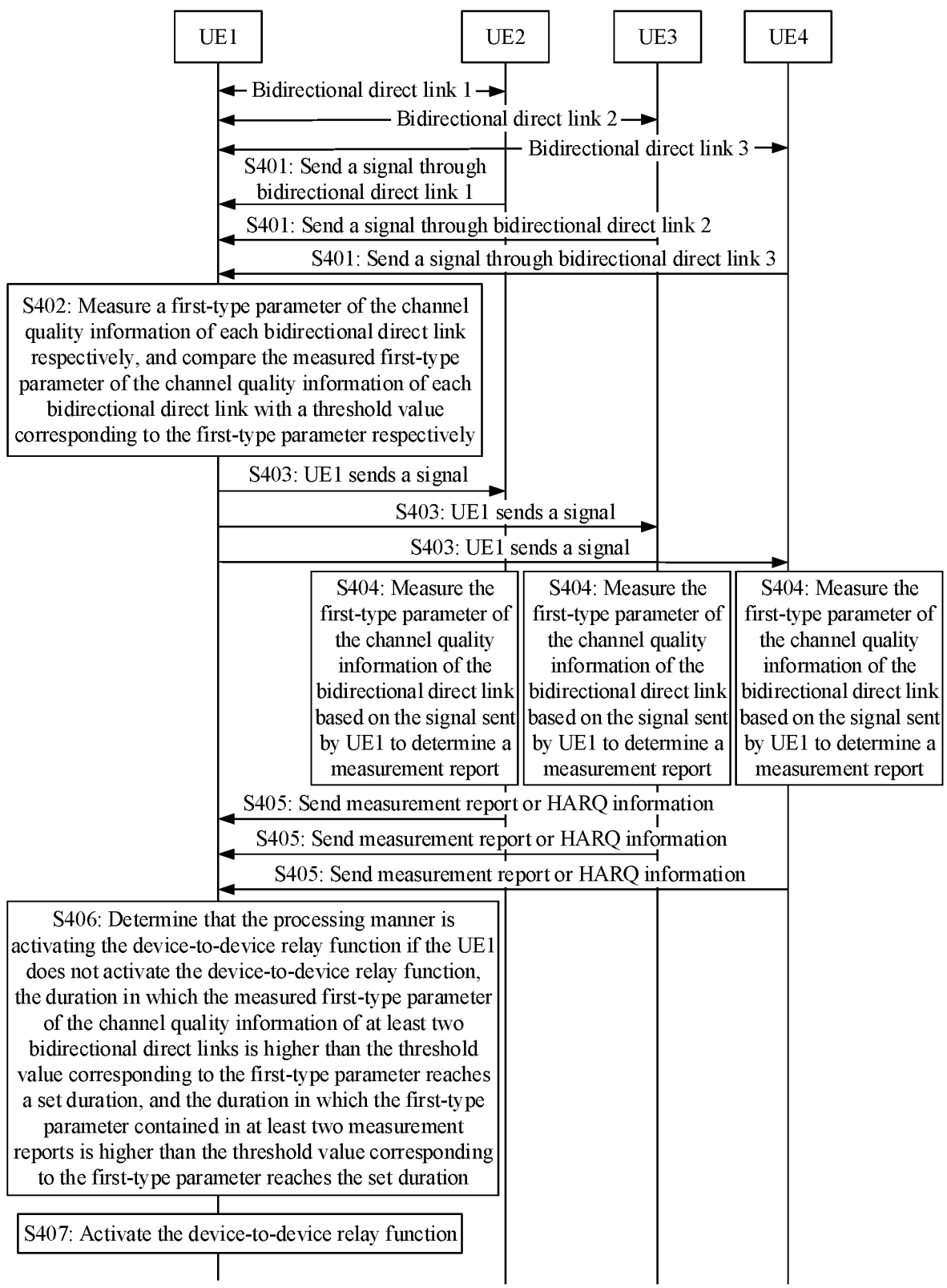
FIG. 4 is an interaction flowchart of a processing method for device-to-device relay according to an embodiment of the present application.

Referring to FIG. 4, the specific process is as follows.

Step S401: the UE2, UE3 and UE4 may send signals through the bidirectional direct link 1, bidirectional direct link 2 and bidirectional direct link 3, respectively.

Step S402: the UE1 receives the signals sent by the UE2, UE3 and UE4 through the bidirectional direct links, measures a first-type parameter of the channel quality information of each bidirectional direct link respectively, and compares the measured first-type parameter of each bidirectional direct link with a threshold value corresponding to the first-type parameter respectively.

The threshold value corresponding to the first-type parameter includes one or more of: the threshold value corresponding to CSI, the threshold value corresponding to RSSI, the threshold value corresponding to RSRP, the threshold value corresponding to RSRQ. In this step, the UE1 measures one or more of CSI, RSSI, RSRP or RSRQ of each bidirectional direct link respectively, and compares the measured first-type parameters with the corresponding threshold values respectively.

Step S403: the UE1 sends signals to the UE2, UE3 and UE4 through the bidirectional direct link 1, bidirectional direct link 2 and bidirectional direct link 3 respectively.

Step S404: the UE2, UE3 and UE4 receive the signals sent by the UE1 through the corresponding bidirectional direct links respectively, and measure the first-type parameter of the channel quality information of the corresponding bidirectional direct links to determine the measurement reports respectively.

Here, the UE2, UE3 and UE4 measure one or more of CSI, RSSI, RSRP or RSRQ of the corresponding bidirectional direct links, respectively.

Each measurement report contains the first-type parameter of the channel quality information of the corresponding bidirectional direct link. For example, the measurement report determined by the UE2 contains the first-type parameter of the channel quality information corresponding to the bidirectional direct link 1. The first-type parameter of the channel quality information contained in the measurement report may be the HARQ information determined by the UE2, UE3 or UE4 according to the received signal.

Step S405: the UE2, UE3, and UE4 may send the respective determined measurement reports or determined HARQ information through the bidirectional direct link 1, bidirectional direct link 2 and bidirectional direct link 3, respectively.

It should be noted that the above steps S401 and S403 have no fixed sequence, and can be set according to actual needs.

Step S406: determine that the processing manner is activating the device-to-device relay function if the UE1 does not activate the device-to-device relay function, the duration in which the measured first-type parameter of the channel quality information of at least two bidirectional direct links is higher than the threshold value corresponding to the first-type parameter reaches a set duration, and the duration in which the first-type parameter contained in at least two measurement reports is higher than the threshold value corresponding to the first-type parameter reaches the set duration.

Step S407: the UE1 activates the device-to-device relay function based on the processing manner.

EXAMPLE 3

This example is an interaction flowchart of a device-to-device relay processing method according to an embodiment of the present application, where the first device is UE1 and the second devices are UE2, UE3 and UE4, as an example for description.

In this example, the parameter of the channel quality information includes a second-type parameter (that is, one or more of bit error rate or block error rate), the direct link is a unidirectional direct link, and the unidirectional direct link in this example may be PSCCH, PSSCH, PSBCH, synchronization signal link, etc.

There are a unidirectional direct link 1 between UE1 and UE2, a unidirectional direct link 2 between UE1 and UE3, and a unidirectional direct link 3 between UE1 and UE4. The UE2, UE3, and UE4 can send signals through the unidirectional direct link 1, unidirectional direct link 2 and unidirectional direct link 3, respectively.

The UE1 receives the signals sent by the UE2, UE3 and UE4 through the above unidirectional direct links, and measures a second-type parameter of the channel quality information of the unidirectional direct links according to the signals, and then compares the measured second-type parameter with a threshold value corresponding to the parameter to determine whether to activate the device-to-device relay function.

Figure 5:
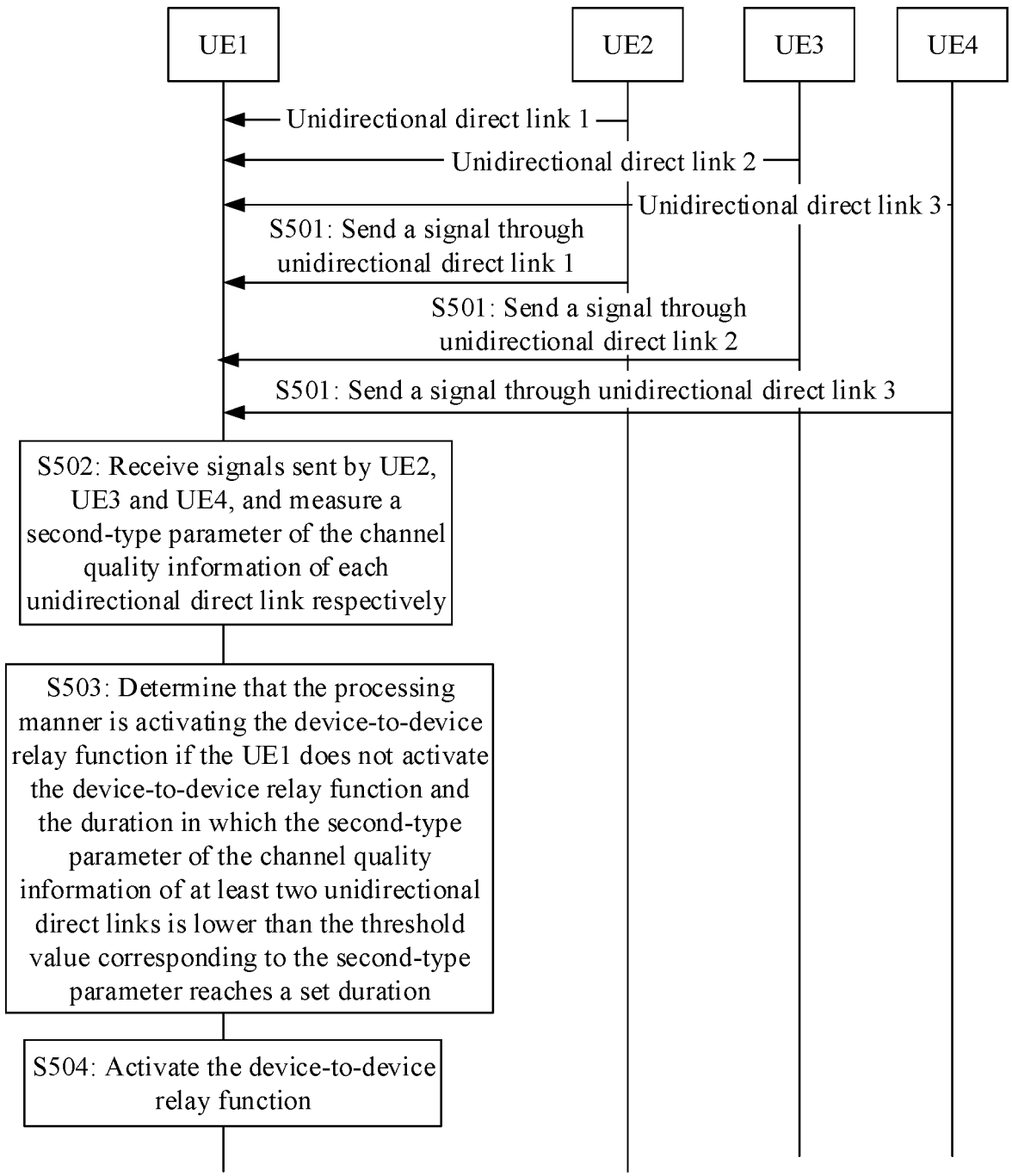
FIG. 5 is an interaction flowchart of a processing method for device-to-device relay according to an embodiment of the present application.

Referring to FIG. 5, the specific process is as follows.

Step S501: the UE2, UE3 and UE4 may send signals through the unidirectional direct link 1, unidirectional direct link 2 and unidirectional direct link 3, respectively.

Step S502: the UE1 receives the signals sent by the UE2, UE3 and UE4 through the unidirectional direct links, and measures a second-type parameter of the channel quality information of each unidirectional direct link respectively.

Here, the UE1 measures one or more of the bit error rate or block error rate of each unidirectional direct link.

Step S503: the UE1 compares the measured second-type parameter of the channel quality information of each unidirectional direct link with the threshold value corresponding to the second-type parameter respectively, and determines that the processing manner is activating the device-to-device relay function if the UE1 does not activate the device-to-device relay function and the duration in which the second-type parameter of the channel quality information of at least two unidirectional direct links is lower than the threshold value corresponding to the second-type parameter reaches a set duration.

The threshold value corresponding to the second-type parameter includes one or more of: the threshold value corresponding to the block error rate, or the threshold value corresponding to the bit error rate. In this step, the UE1 compares one or more of the block error rate or bit error rate obtained by measuring each unidirectional direct link with the corresponding threshold value(s) respectively.

Step S504: the UE1 activates the device-to-device relay function based on the processing manner.

EXAMPLE 4

This example is an interaction flowchart of a device-to-device relay processing method according to an embodiment of the present application, where the first device is UE1 and the second devices are UE2, UE3 and UE4, as an example for description.

In this example, the parameter of the channel quality information includes a second-type parameter (that is, one or more of bit error rate or block error rate), the direct link is a bidirectional direct link, and the bidirectional direct link in this example may be PSCCH, PSSCH, PSBCH, synchronization signal link, etc.

There are a bidirectional direct link 1 between UE1 and UE2, a bidirectional direct link 2 between UE1 and UE3, and a bidirectional direct link 3 between UE1 and UE4; the UE2, UE3, and UE4 can receive signals sent by the UE1 through the bidirectional direct link 1, bidirectional direct link 2 and bidirectional direct link 3 respectively, and can also send signals and measurement reports for the signals sent by the UE1 through the bidirectional direct link 1, bidirectional direct link 2 and bidirectional direct link 3 respectively.

The UE1 receives the signals sent by the UE2, UE3 and UE4 through the above-mentioned bidirectional direct links, and can also receive the measurement reports sent by the UE2, UE3 and UE4 through the above-mentioned bidirectional direct links; and the UE1 can measure a second-type parameter of the channel quality information of the bidirectional direct links according to the signals, and then compare the measured second-type parameter with a threshold value corresponding to the parameter, to determine whether each bidirectional direct link meets the condition for activating the device-to-device relay function in the direction in which the UE1 receives signals; and the UE can determine whether the bidirectional direct link meets the condition for activating the device-to-device relay function in the direction in which the UE1 sends signals according to the received corresponding measurement report.

Figure 6:
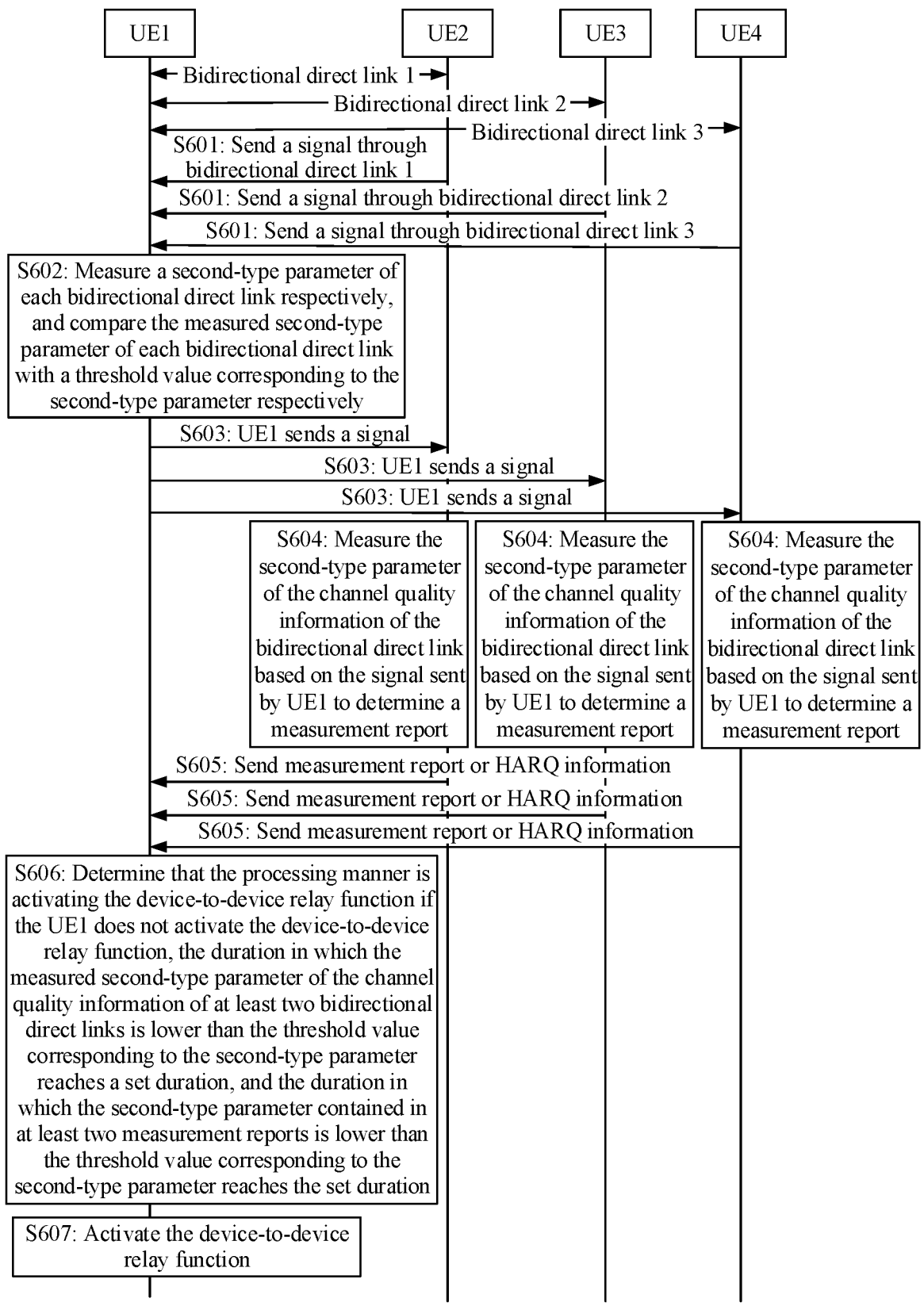
FIG. 6 is an interaction flowchart of a processing method for device-to-device relay according to an embodiment of the present application.

Referring to FIG. 6, the specific process is as follows.

Step S601: the UE2, UE3 and UE4 may send signals through the bidirectional direct link 1, bidirectional direct link 2 and bidirectional direct link 3, respectively.

Step S602: the UE1 receives the signals sent by the UE2, UE3 and UE4 through the bidirectional direct links, measures a second-type parameter of the channel quality information of each bidirectional direct link respectively, and compares the measured second-type parameter of each bidirectional direct link with a threshold value corresponding to the second-type parameter respectively.

The threshold value corresponding to the second-type parameter includes one or more of: the threshold value corresponding to the block error rate, or the threshold value corresponding to the bit error rate. In this step, the UE1 measures one or more of the block error rate or bit error rate of each unidirectional direct link respectively, and compares the measured second-type parameters with the corresponding threshold values respectively.

Step S603: the UE1 sends signals to the UE2, UE3 and UE4 through the bidirectional direct link 1, bidirectional direct link 2 and bidirectional direct link 3 respectively.

Step S604: the UE2, UE3 and UE4 receive the signals sent by the UE1 through the corresponding bidirectional direct links respectively, and measure the second-type parameter of the channel quality information of the corresponding bidirectional direct links to determine the measurement reports respectively.

Here, the UE2, UE3 and UE4 measure one or more of the block error rate or bit error rate of the corresponding bidirectional direct links, respectively.

Each measurement report contains the second-type parameter of the channel quality information of the corresponding bidirectional direct link. For example, the measurement report determined by the UE2 contains the second-type parameter of the channel quality information corresponding to the bidirectional direct link 1. The second-type parameter of the channel quality information contained in the measurement report may be the HARQ information determined by the UE2, UE3 or UE4 according to the received signal.

Step S605: the UE2, UE3, and UE4 may send the respective determined measurement reports or determined HARQ information through the bidirectional direct link 1, bidirectional direct link 2 and bidirectional direct link 3, respectively.

It should be noted that the above steps S601 and S603 have no fixed sequence, and can be set according to actual needs.

Step S606: determine that the processing manner is activating the device-to-device relay function if the UE1 does not activate the device-to-device relay function, the duration in which the measured second-type parameter of the channel quality information of at least two bidirectional direct links is lower than the threshold value corresponding to the second-type parameter reaches a set duration, and the duration in which the second-type parameter contained in at least two measurement reports is lower than the threshold value corresponding to the second-type parameter reaches the set duration.

Step S607: the UE1 activates the device-to-device relay function based on the processing manner.

Figure 7:
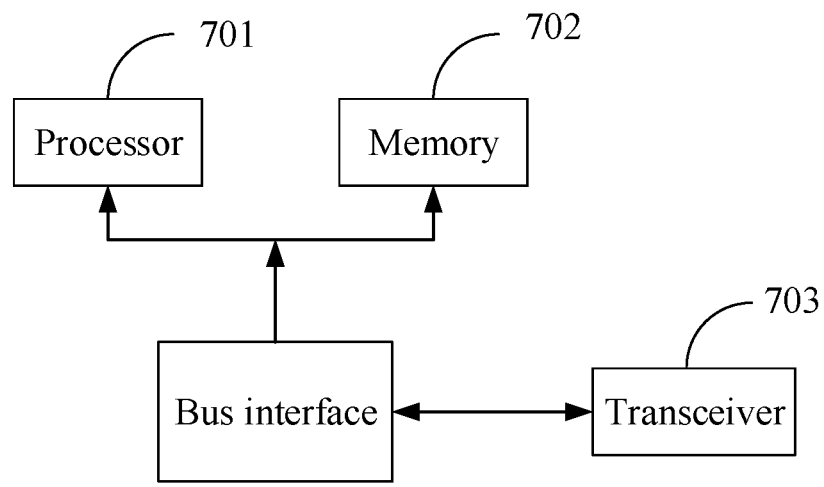
FIG. 7 is a schematic diagram of a terminal device according to an embodiment of the present application.

As shown in FIG. 7, based on the same application concept, this embodiment further provides a terminal device, which includes a processor 701, a memory 702 and a transceiver 703. The processor 701 is responsible for managing the bus architecture and general processing, and the memory 702 may store the data used by processor 701 in performing operations. The transceiver 703 is configured to receive and send the data under the control of the processor 701.

The bus architecture may include any numbers of interconnected buses and bridges, and specifically link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface provides an interface; the processor 701 is responsible for managing the bus architecture and general processing, and the memory 702 may store the data used by the processor 701 in performing the operations.

The procedure disclosed by the embodiment of the present application may be applied in the processor 701 or implemented by the processor 701. In the implementation process, each step of the signal processing flow may be completed by the integrated logic circuit of hardware in the processor 701 or the instruction in the form of software. The processor 701 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 702, and the processor 701 reads the information in the memory 702 and completes the steps of the signal processing flow in combination with its hardware.

Here, the memory 702 is configured to store a program executable by the processor 701, and the processor 701 is configured to read the program in the memory 702 and perform the following step:

determining a processing manner of the terminal device for a device-to-device relay function according to channel quality information of direct links between the terminal device and at least two second devices, where the processing manner includes activating the device-to-device relay function or deactivating the device-to-device relay function.

In one embodiment, the processor 701 is specifically configured to:

compare a parameter included in the channel quality information of the direct links between the terminal device and the at least two second devices with a threshold value corresponding to the parameter to determine the processing manner for the device-to-device relay function.

In one embodiment, the parameter of the channel quality information includes a first-type parameter and/or a second-type parameter, where:

the first-type parameter includes one or more of: CSI, RSSI, RSRP, or RSRQ;

the second-type parameter includes one or more of: block error rate or bit error rate.

In one embodiment, the parameter of the channel quality information includes the first-type parameter; and the processor 701 is specifically configured to:

when the direct links are unidirectional direct links: measure a first-type parameter of channel quality information of signals sent by the at least two second devices through the direct links with the at least two second devices; and determine that the processing manner is activating the device-to-device relay function if the terminal device does not activate the device-to-device relay function and a duration in which the measured first-type parameter of the channel quality information of the at least two direct links is higher than the threshold value corresponding to the parameter reaches a set duration; and/or when the direct links are bidirectional direct links: measure a first-type parameter of channel quality information of signals sent by the at least two second devices through the direct links with the at least two second devices, and receive measurement reports sent by the at least two second devices through the direct links, where each of the measurement reports contains a first-type parameter of channel quality information obtained by a corresponding second device measuring a signal sent by the terminal device; and determine that the processing manner is activating the device-to-device relay function if the terminal device does not activate the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration.

In one embodiment, the parameter of the channel quality information includes the second-type parameter; and the processor 701 is configured to:

when the direct links are unidirectional direct links: measure a second-type parameter of channel quality information of signals sent by the at least two second devices through the direct links with the at least two second devices; and determine that the processing manner is activating the device-to-device relay function if the terminal device does not activate the device-to-device relay function and a duration in which the measured second-type parameter of the channel quality information of the at least two direct links is lower than the threshold value corresponding to the parameter reaches a set duration; and/or when the direct links are bidirectional direct links: measure a second-type parameter of channel quality information of signals sent by the at least two second devices through the direct links with the at least two second devices, and receive measurement reports sent by the at least two second devices through the direct links, where each of the measurement reports contains a second-type parameter of channel quality information obtained by a corresponding second device measuring a signal sent by the terminal device; and determine that the processing manner is activating the device-to-device relay function if the terminal device does not activate the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

In one embodiment, the parameter of the channel quality information contained in the measurement reports is determined through HARQ information sent by the at least two second devices.

In one embodiment, the processor 701 is further configured to:

determine that the processing manner is deactivating the device-to-device relay function if the terminal device has activated the device-to-device relay function and less than two direct links meet a condition that the duration in which the measured first-type parameter of the channel quality information is higher than the threshold value corresponding to the parameter reaches the set duration.

In one embodiment, the processor 701 is further configured to:

determine that the processing manner is deactivating the device-to-device relay function if the terminal device has activated the device-to-device relay function and less than two direct links meet a condition that the duration in which the measured second-type parameter of the channel quality information is lower than the threshold value corresponding to the parameter reaches the set duration.

In one embodiment, the set duration and/or the threshold value corresponding to the parameter is/are configured by a network; and/or the set duration and/or the threshold value corresponding to the parameter is/are pre-configured for the terminal device.

Figure 8:
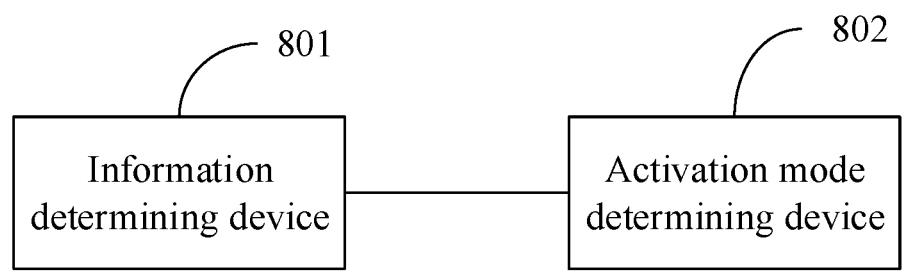
FIG. 8 is a schematic diagram of a terminal apparatus according to an embodiment of the present application.

As shown in FIG. 8, based on the same application concept, this embodiment further provides a terminal apparatus, including:

an information determining device 801 configured to determine channel quality information of direct links between the terminal apparatus and at least two second devices;

an activation mode determining device 802 configured to determine a processing manner of the terminal apparatus for a device-to-device relay function according to the channel quality information of the direct links between the terminal apparatus and the at least two second devices, where the processing manner includes activating the device-to-device relay function or deactivating the device-to-device relay function.

In one embodiment, the activation mode determining device 802 is configured to:

compare a parameter included in the channel quality information of the direct links between the terminal apparatus and the at least two second devices with a threshold value corresponding to the parameter to determine the processing manner for the device-to-device relay function.

In one embodiment, the parameter of the channel quality information includes a first-type parameter and/or a second-type parameter, where:

the first-type parameter includes one or more of: CSI, RSSI, RSRP, or RSRQ;

the second-type parameter includes one or more of: block error rate or bit error rate.

In one embodiment, the parameter of the channel quality information includes the first-type parameter, and the activation mode determining device 802 is configured to:

when the direct links are unidirectional direct links: measure a first-type parameter of channel quality information of signals sent by the at least two second devices through the direct links with the at least two second devices; and determine that the processing manner is activating the device-to-device relay function if the terminal apparatus does not activate the device-to-device relay function and a duration in which the measured first-type parameter of the channel quality information of the at least two direct links is higher than the threshold value corresponding to the parameter reaches a set duration; and/or when the direct links are bidirectional direct links: measure a first-type parameter of channel quality information of signals sent by the at least two second devices through the direct links with the at least two second devices, and receive measurement reports sent by the at least two second devices through the direct links, where each of the measurement reports contains a first-type parameter of channel quality information obtained by a corresponding second device measuring a signal sent by the terminal apparatus; and determine that the processing manner is activating the device-to-device relay function if the terminal apparatus does not activate the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration.

In one embodiment, the parameter of the channel quality information includes the second-type parameter, and the activation mode determining device 802 is configured to:

when the direct links are unidirectional direct links: measure a second-type parameter of channel quality information of signals sent by the at least two second devices through the direct links with the at least two second devices; and determine that the processing manner is activating the device-to-device relay function if the terminal apparatus does not activate the device-to-device relay function and a duration in which the measured second-type parameter of the channel quality information of the at least two direct links is lower than the threshold value corresponding to the parameter reaches a set duration; and/or when the direct links are bidirectional direct links: measure a second-type parameter of channel quality information of signals sent by the at least two second devices through the direct links with the at least two second devices, and receive measurement reports sent by the at least two second devices through the direct links, where each of the measurement reports contains a second-type parameter of channel quality information obtained by a corresponding second device measuring a signal sent by the terminal apparatus; and determine that the processing manner is activating the device-to-device relay function if the terminal apparatus does not activate the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

In one embodiment, the parameter of the channel quality information contained in the measurement reports is determined through HARQ information sent by the at least two second devices.

In one embodiment, the activation mode determining device 802 is further configured to:

determine that the processing manner is deactivating the device-to-device relay function if the device-to-device relay function has been activated and less than two direct links meet a condition that the duration in which the measured first-type parameter of the channel quality information is higher than the threshold value corresponding to the parameter reaches the set duration.

In one embodiment, the activation mode determining device 802 is further configured to:

determine that the processing manner is deactivating the device-to-device relay function if the device-to-device relay function has been activated and less than two direct links meet a condition that the duration in which the measured second-type parameter of the channel quality information is lower than the threshold value corresponding to the parameter reaches the set duration.

In one embodiment, the set duration and/or the threshold value corresponding to the parameter is/are configured by a network; and/or the set duration and/or the threshold value corresponding to the parameter is/are pre-configured for the terminal apparatus.

An embodiment of the present application provides a non-transitory computer-readable storage medium including program codes. When the program codes run on a computing device, the program codes are configured to cause the computing terminal to perform the steps of the above method provided in embodiments of the present application.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing device to produce a machine, and the instructions executed by the computer processor and/or another programmable data processing device create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently embodiments of the present application without departing from the spirit and scope of the present application. Thus, the present application is also intended to encompass these modifications and variations therein as long as these modifications and variations to the present application come into the scope of the claims of the present application and their equivalents.

What is claimed is:

1. A device-to-device relay processing method, comprises:

comparing, by a first device, a parameter included in a channel quality information of direct links between the first device and at least two second devices with a threshold value corresponding to the parameter to determine a processing manner for a device-to-device relay function, wherein the processing manner comprises activating the device-to-device relay function or deactivating the device-to-device relay function;

wherein the parameter of the channel quality information comprises a first-type parameter and/or a second-type parameter, wherein:

the first-type parameter comprises one or more of: Channel State Information, CSI; Received Signal Strength Indication, RSSI; Reference Signal Receiving Power, RSRP; or Reference Signal Receiving Quality, RSRQ;

the second-type parameter comprises one or more of: a block error rate or a bit error rate;

wherein in a case of that the parameter of the channel quality information comprises the first-type parameter; and the comparing, by the first device, the parameter included in the channel quality information of the direct links between the first device and the at least two second devices with the threshold value corresponding to the parameter to determine the processing manner for the device-to-device relay function, comprises:

in response to the direct links being unidirectional direct links, measuring, by the first device, a first-type parameter of channel quality information of signals sent by the at least two second devices through the direct links with the at least two second devices; and determining that the processing manner is activating the device-to-device relay function in response to the first device not activating the device-to-device relay function and a duration in which measured first-type parameter of the channel quality information of the at least two direct links is higher than the threshold value corresponding to the parameter reaches a set duration; and/or in response to the direct links being bidirectional direct links: measuring, by the first device, a first-type parameter of channel quality information of signals sent by the at least two second devices through the direct links with the at least two second devices, and receiving measurement reports sent by the at least two second devices through the direct links, wherein each of the measurement reports contains a first-type parameter of channel quality information obtained by a corresponding second device measuring a signal sent by the first device; and determining that the processing manner is activating the device-to-device relay function in response to the first device not activating the device-to-device relay function, a duration in which measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration;

wherein in a case of that the parameter of the channel quality information comprises the second-type parameter; and the comparing, by the first device, the parameter included in the channel quality information of the direct links between the first device and the at least two second devices with the threshold value corresponding to the parameter to determine the processing manner for the device-to-device relay function, comprises:

in response to the direct links being unidirectional direct links: measuring, by the first device, a second-type parameter of channel quality information of signals sent by the at least two second devices through the direct links with the at least two second devices; and determining that the processing manner is activating the device-to-device relay function in response to the first device not activating the device-to-device relay function and a duration in which the measured second-type parameter of the channel quality information of the at least two direct links is lower than the threshold value corresponding to the parameter reaches a set duration; and/or in response to the direct links being bidirectional direct links: measuring, by the first device, a second-type parameter of channel quality information of signals sent by the at least two second devices through the direct links with the at least two second devices, and receiving measurement reports sent by the at least two second devices through the direct links, wherein each of the measurement reports contains a second-type parameter of channel quality information obtained by a corresponding second device measuring a signal sent by the first device; and determining that the processing manner is activating the device-to-device relay function in response to the first device not activating the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

2. The method according to claim 1, wherein in a case of that the parameter of the channel quality information comprises the second-type parameter, the parameter of the channel quality information contained in the measurement reports is determined through Hybrid Automatic Repeat Request, HARQ, information sent by the at least two second devices.

3. The method according to claim 1, wherein in a case of that the parameter of the channel quality information comprises the first-type parameter, the method further comprises:
determining that the processing manner is deactivating the device-to-device relay function in response to the first device having activated the device-to-device relay function and less than two direct links meet a condition that the duration in which the measured first-type parameter of the channel quality information is higher than the threshold value corresponding to the parameter reaches the set duration.

4. The method according to claim 1, wherein in a case of in a case of that the parameter of the channel quality information comprises the second-type parameter, the method further comprises:
determining that the processing manner is deactivating the device-to-device relay function in response to the first device having activated the device-to-device relay function and less than two direct links meet a condition that the duration in which the measured second-type parameter of the channel quality information is lower than the threshold value corresponding to the parameter reaches the set duration.

5. The method according to claim 1, wherein in a case of that the parameter of the channel quality information comprises the first-type parameter, the set duration and/or the threshold value corresponding to the parameter is/are configured by a network; and/or
the set duration and/or the threshold value corresponding to the parameter is/are pre-configured for the first device.

6. A non-transitory computer storage medium storing a computer program thereon, wherein the program implements steps of the method of claim 1 when executed by a processor.

7. A terminal device, comprises: a processor and a memory;
wherein the memory is configured to store a program executable by the processor, and the processor is configured to read the program in the memory and execute following processes:
comparing a parameter included in a channel quality information of direct links between the terminal device and at least two second devices with a threshold value corresponding to the parameter to determine a processing manner for a device-to-device relay function, wherein the processing manner comprises activating the device-to-device relay function or deactivating the device-to-device relay function;

wherein the parameter of the channel quality information comprises a first-type parameter and/or a second-type parameter, wherein:

the first-type parameter comprises one or more of: Channel State Information, CSI; Received Signal Strength Indication, RSSI; Reference Signal Receiving Power, RSRP; or Reference Signal Receiving Quality, RSRQ;

the second-type parameter comprises one or more of: a block error rate or a bit error rate;

wherein in a case of that the parameter of the channel quality information comprises the first-type parameter; and the processor is configured to:

in response to the direct links being unidirectional direct links: measure a first-type parameter of channel quality information of signals sent by the at least two second devices through the direct links with the at least two second devices; and determine that the processing manner is activating the device-to-device relay function in response to the terminal device not activating the device-to-device relay function and a duration in which the measured first-type parameter of the channel quality information of the at least two direct links is higher than the threshold value corresponding to the parameter reaches a set duration; and/or in response to the direct links being bidirectional direct links: measure a first-type parameter of channel quality information of signals sent by the at least two second devices through the direct links with the at least two second devices, and receive measurement reports sent by the at least two second devices through the direct links, wherein each of the measurement reports contains a first-type parameter of channel quality information obtained by a corresponding second device measuring a signal sent by the terminal device; and determine that the processing manner is activating the device-to-device relay function in response to the terminal device not activating the device-to-device relay function, a duration in which the measured first-type parameter of the channel quality information of the at least two direct links is higher than the threshold value corresponding to the parameter reaches a set duration, and a duration in which the first-type parameter contained in the measurement reports received through the at least two direct links is higher than the threshold value corresponding to the parameter reaches the set duration;

wherein in a case of that the parameter of the channel quality information comprises the second-type parameter, and the processor is configured to:

in response to the direct links being unidirectional direct links: measure a second-type parameter of channel quality information of signals sent by the at least two second devices through the direct links with the at least two second devices; and determine that the processing manner is activating the device-to-device relay function in response to the terminal device not activating the device-to-device relay function and a duration in which the measured second-type parameter of the channel quality information of the at least two direct links is lower than the threshold value corresponding to the parameter reaches a set duration; and/or in response to the direct links being bidirectional direct links: measure a second-type parameter of channel quality information of signals sent by the at least two second devices through the direct links with the at least two second devices, and receive measurement reports sent by the at least two second devices through the direct links, wherein each of the measurement reports contains a second-type parameter of channel quality information obtained by a corresponding second device measuring a signal sent by the terminal device; and determine that the processing manner is activating the device-to-device relay function in response to the terminal device not activating the device-to-device relay function, a duration in which the measured second-type parameter of the channel quality information of the at least two direct links is lower than the threshold value corresponding to the parameter reaches a set duration, and a duration in which the second-type parameter contained in the measurement reports received through the at least two direct links is lower than the threshold value corresponding to the parameter reaches the set duration.

8. The terminal device according to claim 7, wherein in a case of that the parameter of the channel quality information comprises the second-type parameter, the parameter of the channel quality information contained in the measurement reports is determined through Hybrid Automatic Repeat Request, HARQ, information sent by the at least two second devices.

9. The terminal device according to claim 7, wherein in a case of that the parameter of the channel quality information comprises the first-type parameter, the processor is further configured to:

determine that the processing manner is deactivating the device-to-device relay function in response to the terminal device having activated the device-to-device relay function and less than two direct links meet a condition that the duration in which the measured first-type parameter of the channel quality information is higher than the threshold value corresponding to the parameter reaches the set duration.

10. The terminal device according to claim 7, wherein in a case of that the parameter of the channel quality information comprises the second-type parameter, the processor is further configured to:

determine that the processing manner is deactivating the device-to-device relay function in response to the terminal device having activated the device-to-device relay function and less than two direct links meet a condition that the duration in which the measured second-type parameter of the channel quality information is lower than the threshold value corresponding to the parameter reaches the set duration.

11. The terminal device according to claim 7, wherein in a case of that the parameter of the channel quality information comprises the first-type parameter, the set duration and/or the threshold value corresponding to the parameter is/are configured by a network; and/or the set duration and/or the threshold value corresponding to the parameter is/are pre-configured for the terminal device.

* * * * *